June 26, 1923.
E. STANSFIELD
1,459,932
PROCESS OF HEAT TREATMENT
Filed April 3, 1920
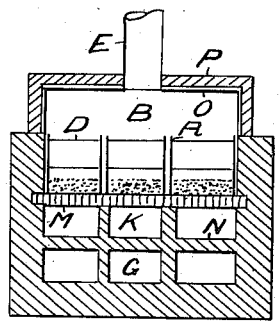
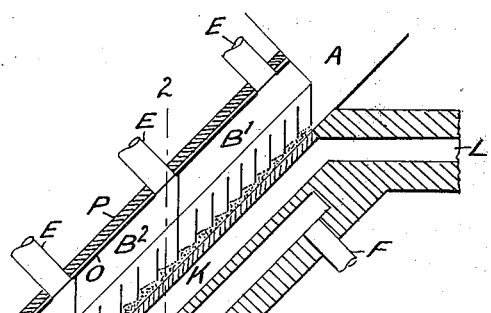
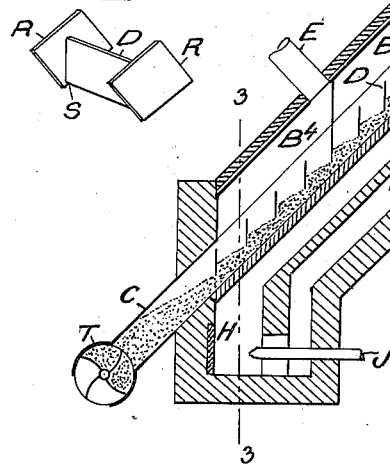
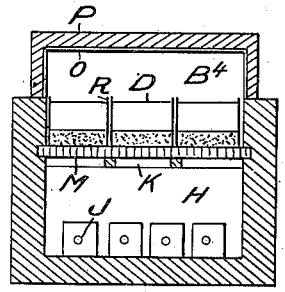
Inventor
Edgar Stansfield
By
Attorney

Patented June 26, 1923.

UNITED STATES PATENT OFFICE.

EDGAR STANSFIELD, OF OTTAWA, ONTARIO, CANADA.

PROCESS OF HEAT TREATMENT.

Application filed April 3, 1920. Serial No. 371,136.

*To all whom it may concern:*

Be it known that I, EDGAR STANSFIELD, a subject of the King of Great Britain and Ireland, residing at Ottawa, in the Province of Ontario, Dominion of Canada, have invented new and useful Improvements in the Processes of Heat Treatment, of which the following is a specification.

This invention relates to the process of heat treatment of materials and more particularly to the process of heat treating or carbonizing coal, lignite, peat, or other carbonaceous material, and has for its object to provide a continuous process in which the material is uniformly heated to the desired temperature, with greater rapidity than by former methods.

A further object is to provide a process by which the gases given off at various temperatures can be withdrawn separately, and kept free from contact with heated surfaces which might cause secondary decomposition.

The process consists in feeding carbonaceous material on to the heated floor of a retort in a thin layer at the cooler end, allowing or causing it to pass through zones of increasing temperature, and withdrawing it from the other end, the gases and vapours produced being drawn off from above the material, and the treatment being controlled by the rate of passage through the retort of the material treated.

By means of this process all the material is thoroughly treated at a succession of increasing temperatures, and the gases given off at the different temperatures are immediately withdrawn and can be separated and kept distinct and used for separate purposes.

In the methods hitherto adopted the material has usually been treated in the mass. The heat applied had to penetrate thick layers to effect carbonization, and the wall temperatures had to be carefully regulated to avoid overheating the material adjacent to the heated wall. This necessitated a longer period of treatment. The gases produced at different temperatures became mixed, and were liable to be exposed to highly heated surfaces whereby secondary decomposition took place.

The particular method that I have employed is now described.

The material to be treated, suitably crushed, is subjected in a thin layer to a gradually increasing temperature on the floor of an inclined retort, along which it descends by gravity and on which a continuous mixing and agitation is obtained by means of suitable baffles, whereby every particle of the material undergoes the same treatment and a uniform product is obtained at the lower end of the retort.

The gases produced escape freely from the surface of the thin layer of heated material and pass out of the retort without being exposed to heated surfaces liable to produce cracking or further decomposition.

The withdrawal of the treated material from the lower end of the retort can be either continuous or intermittent, and is accomplished by means of suitable mechanism. The period of treatment of the material in the retort is controlled by the speed of withdrawal. This period varies with results desired and with quality of material.

By reason of the rapid movement of the material through the retort and the thorough mixing effected by its repeated passage under baffles, high floor temperatures can be employed in the lower end of the retort without overheating the charge.

I have found that the desired results are obtained when the material travels in very thin layers when cool and in gradually thickening layers as it attains higher temperatures. This causes a slower advance through the hotter zones and provides the necessary duration of treatment in a shorter retort than would otherwise be required.

The process described may be carried out in one way in an apparatus as it appears in the annexed drawings in which Fig. 1 is a vertical section of a furnace and retort.

Fig. 2 is a vertical cross section of Fig. 1 on the line 2—2.

Fig. 3 is a vertical cross section of Fig. 1 on the line 3—3.

Fig. 4 is a detail drawing of the baffle D.

The inclined floor M is made of suitable heat resisting material of good thermal conductivity. Carborundum slabs are preferred for high temperatures and cast iron plate for lower temperatures. This floor is inclined at an angle greater than that of repose of the material. It is heated from below, and is shown as being heated by the gas or oil burner J in the combustion chamber H at the bottom of the combustion flue K.

The air for the burner is shown entering at F and is preferably preheated in the flue G which is just below the flue K and separated from it by the floor N. The products of combustion escape from K through L.

The retort or gas chamber B above the floor M has a gas-tight cover O which is also covered by a layer of heat insulation P. This chamber may be divided into separate compartments $B^1$, $B^2$, $B^3$, $B^4$, with separate gas outlets E. E. At the top of the retort is a feed hopper A and at the bottom is a chute C from which the material is withdrawn by suitable means T.

The baffles D are arranged to cross the retort vertically and are shown supported on the floor M by the end plates R with a clearance S between the baffles and the floor.

By varying the amount of clearance and the frequency of the baffles it is possible to adjust the thickness of the layer of charge to meet varying conditions and to treat materials of different composition and quality. By dividing the floor into two or more parallel channels as shown in Figs. 2 and 3 it is possible to localize any slip in the charge, thereby ensuring a more equalized evolution of gas in the retort.

Having now described my invention what I claim is:

1. The process of heat treatment of moisture containing carbonaceous material which consists in drying and comminuting it, passing it, by gravity, in narrow streams, inclined at a greater angle to the horizontal than the angle of repose of the material, in the absence of air and with the agitation induced by its own motion, causing the layer to increase in thickness, and to be subjected from below to heat sufficient to remove volatile substances from it, which heat increases in temperature as the material moves downward, and withdrawing the volatiles at selected points along the path of the material without subjecting them to contact with directly heated surfaces.

2. The process of heat treatment of moisture containing carbonaceous material which consists in drying and comminuting it, passing it, by gravity, in narrow streams, inclined at a greater angle to the horizontal than the angle of repose of the material, in the absence of air and with the agitation induced by its own motion, causing the layer to increase in thickness, and to be subjected from below to heat sufficient to remove volatile substances from it, which heat increases in temperature as the material moves downward, and withdrawing the volatiles without subjecting them to contact with directly heated surfaces.

3. The process of heat treatment of moisture containing carbonaceous material which consists in drying and comminuting it, passing it, by gravity, in narrow streams, inclined at a greater angle to the horizontal than the angle of repose of the material, in the absence of air and with agitation induced by its own motion, causing the layer to increase in thickness, and to be subjected from below to heat sufficient to remove volatile substances from it, which heat increases in temperature as the material moves downward, and withdrawing the volatiles without subjecting them to contact with directly heated surfaces, and controlling the time of treatment by means of the rate of withdrawal of the treated material.

4. The process of heat treatment of moisture containing carbonaceous material which consists in drying and comminuting it, passing it, by gravity, inclined at a greater angle to the horizontal than the angle of repose of the material, in the absence of air and with agitation induced by its own motion, causing the layer to increase in thickness and to be subjected from below to heat sufficient to remove volatile substances from it, which heat increases in temperature as the material moves downward, and withdrawing the volatiles without subjecting them to contact with directly heated surfaces.

5. The process of heat treatment of moisture containing carbonaceous material which consists in drying and comminuting it, passing it, by gravity, in narrow streams, inclined at a greater angle to the horizontal than the angle of repose of the material, in the absence of air and with agitation induced by its own motion, and to be subjected from below to heat sufficient to remove volatile substances from it, which heat increases in temperature as the material moves downward, and withdrawing the volatiles at selected points along the path of the material without subjecting them to contact with directly heated surfaces.

6. The process of heat treatment of moisture containing carbonaceous material which consists in drying and comminuting it, passing it, by gravity, in narrow streams, inclined at a greater angle to the horizontal than the angle of repose of the material, in the absence of air and with agitation, causing the layer to be increased in thickness and to be subjected from below to heat sufficient to remove volatile substances from it, which heat increases in temperature as the material moves downward, and withdrawing the volatiles without subjecting them to contact with directly heated surfaces.

7. The process of heat treatment of carbonaceous material which consists in comminuting it, passing it, by gravity, in streams, inclined at a greater angle to the horizontal than the angle of repose of the material, in the absence of air, causing the layer to increase in thickness, and to be subjected from below to heat sufficient to remove volatile substances from it, which heat increases in temperature as the material moves downward, and withdrawing the volatiles without subjecting them to contact with directly heated surfaces.

8. The process of heat treatment of carbonaceous material which consists in comminuting it, passing it, by gravity, in streams, inclined at a greater angle to the horizontal than the angle of repose of the material, in the absence of air, causing the layer to increase in thickness, and to be subjected from below to heat sufficient to remove volatile substances from it, which heat increases in temperature as the material moves downward, and withdrawing the volatiles without subjecting them to contact with directly heated surfaces, and controlling the time of treatment by means of the rate of withdrawal of the treated material.

9. The process of heat treatment of carbonaceous material which consists in comminuting it, passing it, by gravity, in the absence of air, causing the layer to increase in thickness, and to be subjected from below to heat sufficient to remove volatile substances from it, which heat increases in temperature as the material moves downward.

10. The process of heat treatment of carbonaceous material which consists in comminuting it, passing it, by gravity, in narrow streams, inclined at a greater angle to the horizontal than the angle of repose of the material, in the absence of air and with agitation, causing the layer to be increased in thickness and to be subjected from below to heat sufficient to remove volatile substances from it, which heat increases in temperature as the material moves downward, and controlling the time of treatment by means of the rate of withdrawal of the treated material.

Signed at Montreal, this twenty-fourth day of March, 1920.

EDGAR STANSFIELD.